US006833754B2

(12) United States Patent
Lancaster

(10) Patent No.: US 6,833,754 B2
(45) Date of Patent: Dec. 21, 2004

(54) RADIO FREQUENCY FILTER

(76) Inventor: Michael John Lancaster, 12 Bramble Gardens, Worcester (GB), WR5 1SQ ( * ) Notice: Subject to any disclaimer, the term of this patent is extended or adjusted under 35 U.S.C. 154(b) by 0 days.

(21) Appl. No.: 10/221,701

(22) PCT Filed: Mar. 16, 2001

(86) PCT No.: PCT/GB01/01188

§ 371 (c)(1),
(2), (4) Date: Dec. 18, 2002

(87) PCT Pub. No.: WO01/69712

PCT Pub. Date: Sep. 20, 2001

(65) Prior Publication Data

US 2003/0184365 A1 Oct. 2, 2003

(30) Foreign Application Priority Data

Mar. 16, 2000 (GB) ............................................ 0006409

(51) Int. Cl.[7] ................................................ H04B 1/10
(52) U.S. Cl. ....................................... 327/551; 333/202
(58) Field of Search ................................ 327/551, 552, 327/553, 556, 557; 333/202–207, 219, 222

(56) References Cited

U.S. PATENT DOCUMENTS 5,689,221 A * 11/1997 Niiranen et al. ............ 333/202
5,910,756 A * 6/1999 Ella ........................... 333/133
6,122,533 A * 9/2000 Zhang et al. ............... 505/210
6,600,390 B2 * 7/2003 Frank ......................... 333/189

FOREIGN PATENT DOCUMENTS

EP 0 336 675 A1 10/1989

* cited by examiner

*Primary Examiner*—Timothy P. Callahan
*Assistant Examiner*—Cassandra Cox
(74) *Attorney, Agent, or Firm*—Hogan & Hartson L.L.P.

(57) ABSTRACT

A radio frequency filter for generating at least first and second predetermined radio frequency bands from a received radio frequency signal. The filter includes an input coupled to a first resonant component, such as a planar open square loop resonator, which in turn is operatively coupled to a second resonant component and a third resonant component. The second and third resonant components are operatively coupled to each other and are coupled to first and second outputs of the filter. In one embodiment, the couplings between resonator components take the form of magnetic and/or electrical couplings. The resonator components are made from conductors or in some cases, from superconducting material. The radio frequency filter operates at microwave frequencies between 500 MHz and 20 GHz.

16 Claims, 4 Drawing Sheets

RADIO FREQUENCY FILTER

FIELD OF INVENTION

The present invention relates to radio frequency filters, and, more particularly, to filters for separating two or more predetermined frequency bands from a radio frequency signal.

The invention has been developed primarily for use in microwave communications systems designed to operate in the 500 MHz to 20 GHz frequency range, and will be described hereinafter with reference to this application. However, it will be appreciated that the invention is not limited to use in this field.

BACKGROUND TO INVENTION

In microwave communications systems, it is often necessary to filter a relatively broadband microwave signal into its component sub-bands. In the past, this has been done using parallel filtering systems. For example, FIG. 1 shows a filter 1 in which a single radio frequency input is split into n parallel outputs 'Out 1' to 'Out n'. This is done using a plurality of resonators 2, which are coupled to each other in a known way to produce a band-limited output. The resonators can be, for example, planar resonators, cavity resonators or any suitable waveguide type resonator. At these frequencies, discrete components such as capacitors and inductors are rare, but can be used.

The difficulty with this approach is that it results in a relatively high component count. Each channel requires a complete set of resonators and couplings to filter out the entire frequency ranges that are not of interest, whilst passing the appropriate frequency range through to the corresponding output. Given the limited space in some systems, it is desirable to reduce the total number of resonators in a given filter.

In some instances, the problem is exacerbated when superconducting resonators are used. Whilst both a simultaneous reduction in space and improvement in performance over non-superconducting designs can be achieved, it is still desirable to further reduce the number of components, since each additional component places a load on the cooling engine used to keep the superconductors cooled to below their critical temperature.

SUMMARY OF INVENTION

In accordance with the invention, there is provided a radio frequency filter for generating at least first and second predetermined radio frequency bands from a received radio frequency signal containing signals in at least the first and second radio frequency bands, the radio frequency filter including:

- a first resonant component for accepting the radio frequency signal via an input coupling;
- a second resonant component operatively coupled to the first resonant component via a first coupling;
- a third resonant component operatively coupled to the first resonant component via a second coupling and to the second resonant component via a third coupling;
- a first output operatively coupled to the second resonant component via a fourth coupling
- a second output operatively coupled to the third resonant component via a fifth coupling;
- wherein the characteristics of the couplings and the resonant components are selected such that the first predetermined radio frequency band is available at the first output and the second radio frequency band is available at the second output.

Preferably one or more of the operative couplings are magnetic inductive and/or electrical capacitive couplings.

In one preferred form, one or more of the resonant components is made wholly or partly of a superconducting material.

In a particularly preferred form, one or more of the operative couplings includes one or more additional resonant components. More preferably, two or more of the additional resonant components are operatively coupled to each other.

Preferably, the filter further includes one or more additional resonant components, each being operatively coupled to one or more of the other resonant components in the filter and to an additional output, wherein additional radio frequency bands are available at the respective additional outputs.

In the preferred embodiment, the filter is configured to operate at microwave frequencies.

BRIEF DESCRIPTION OF DRAWINGS

The invention will now be described, by way of example only, with reference to the accompanying drawings, in which.

DETAILED DESCRIPTION OF PREFERRED AND OTHER EMBODIMENTS

Figure 1:
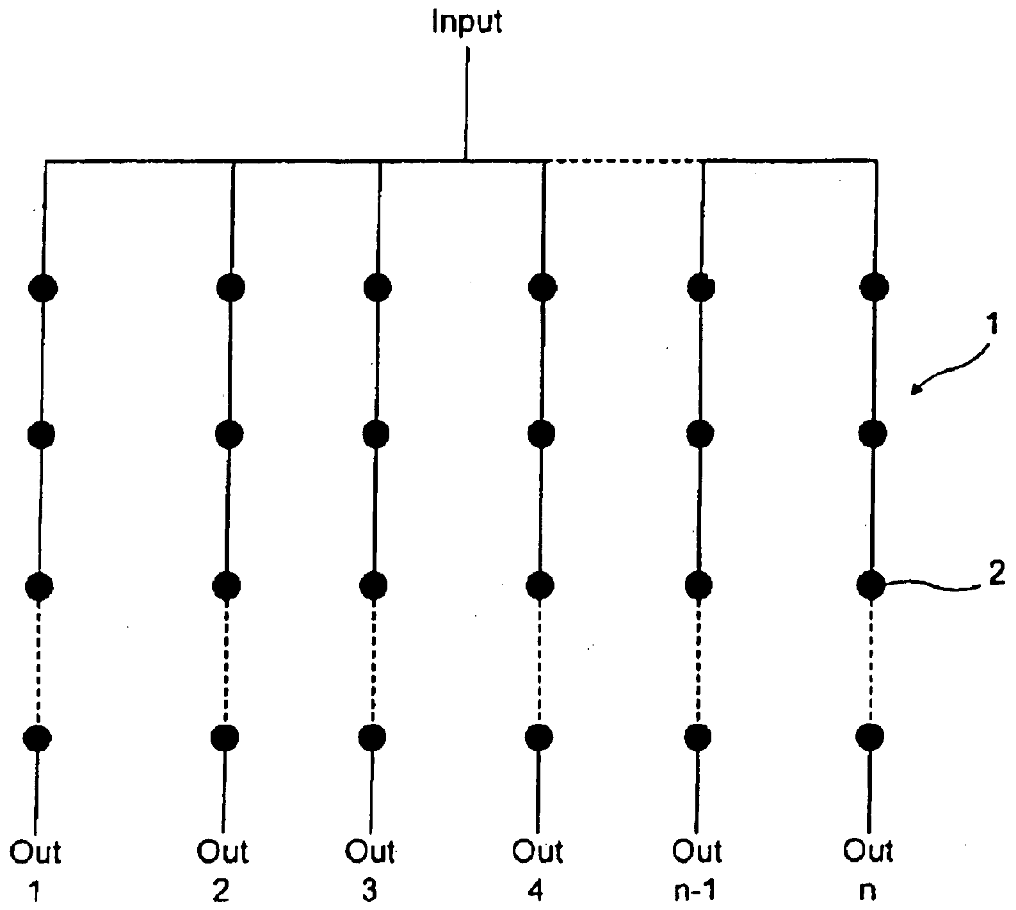
FIG. 1 PRIOR ART
FIG. 1 is a simplified representation of the resonant components and couplings of a prior art filter for channelising individual frequency bands from a microwave input signal.
Figure 2:
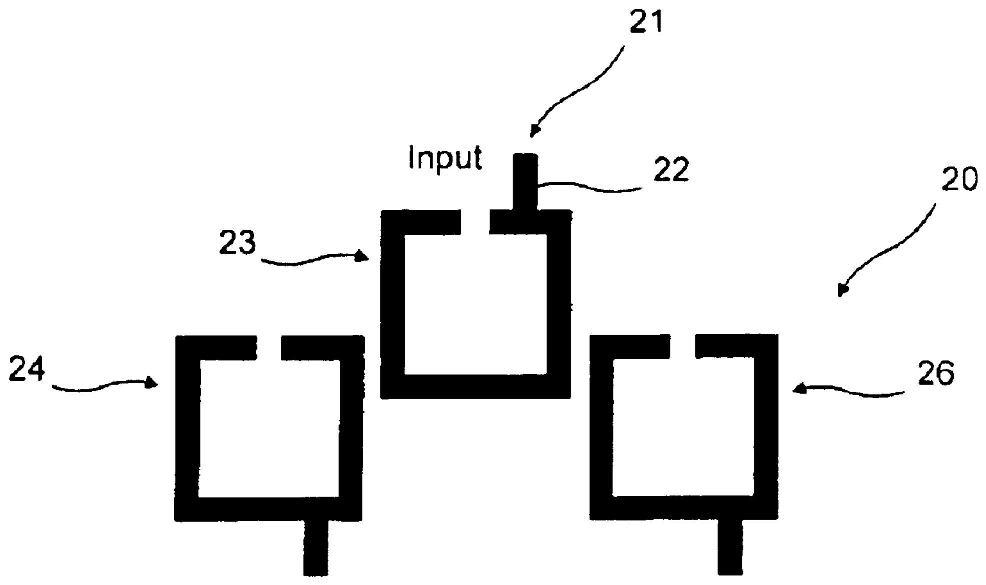
FIG. 2 is a plan view of a filter used for channelising individual frequency bands from a microwave input signal, according to the present invention.
Figure 3:
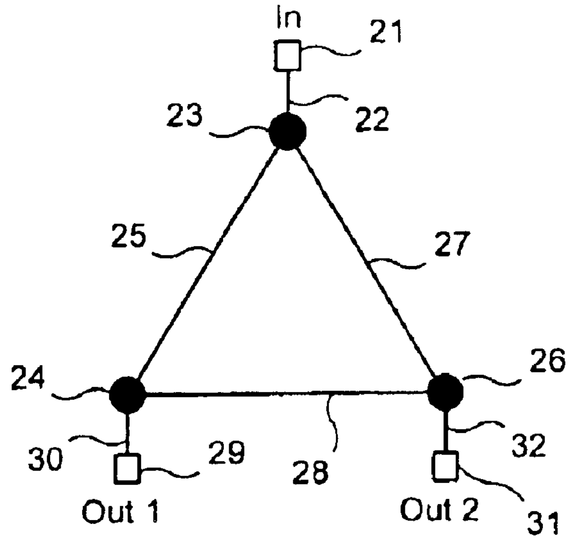
FIG. 3 is a simplified representation of the filter of FIG. 2.

Referring to the drawings, and FIGS. 2 and 3 in particular, a radio frequency filter 20 includes an input 21 operatively coupled via an input coupling 22 to a first resonant component 23. The first resonant component 23 is operatively coupled to a second resonant component 24 via a first coupling 25 and to a third resonant component 26 via a second coupling 27. The second resonant component 24 is operatively coupled to the third resonant component 26 via a third coupling 28. The second resonant component 24 is operatively coupled to a first output 29 via a fourth coupling 30 and the third resonant component 26 is operatively coupled to a second output 31 via a fifth coupling 32.

In the preferred embodiment, each of the resonant components takes the form of a planar open square loop resonator, such as those shown in FIG. 2. In that embodiment, the first, second and third couplings 25, 27 and 28 take the form of magnetic and/or electrical couplings between each of the resonators. The input coupling 22 and the fourth and fifth couplings 30 and 32 are physical conductive couplings. It will be appreciated that the dielectric substrate to which the resonators are mounted, and the accompanying ground plane, have been omitted for clarity.

The relative positioning of the resonators with respect to each other has an impact on the response of the filter, due to the relative contributions of electrical and magnetic fields from each of them. Moreover, the relative distance between each of the couplings also has an effect on the overall response. The interaction between the various components due to their respective responses and the coupling between them can be simulated using a computer.

Figure 4:
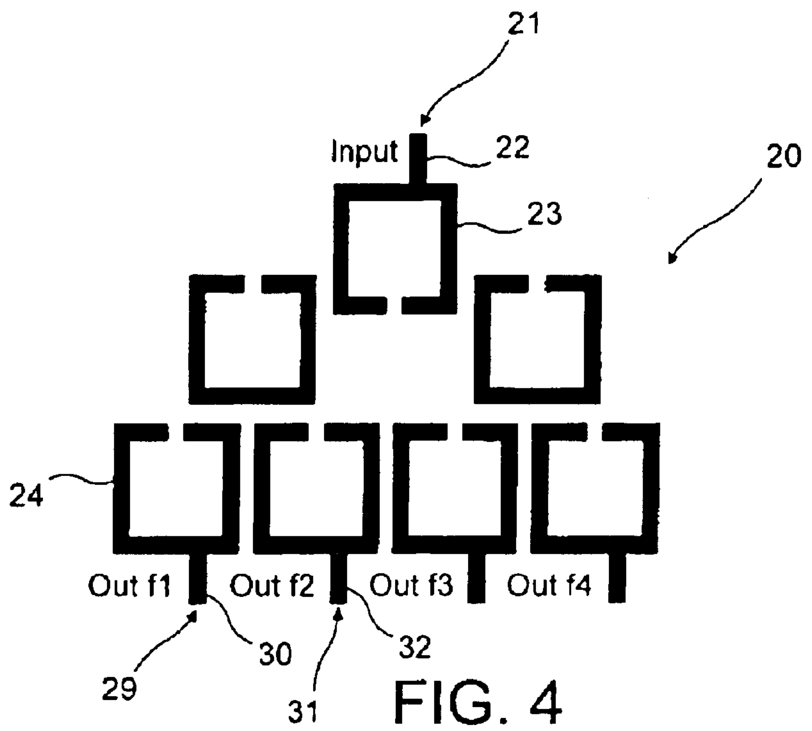
FIG. 4 is a plan view of an alternative embodiment of a filter used for channelising individual frequency bands from a microwave input signal, according to the present invention.

A more complicated version of a filter according to the invention is shown in FIG. 4. In this case, additional resonators are provided and coupled to each other similarly to those in the previous filter. Again, each dot represents a resonant component and each line represents a coupling. As with the earlier filter, each output is coupled directly to a resonator via a conductive coupling, whilst the remaining internal couplings are magnetic and/or electric.

The response of the filter can be designed and simulated using suitable modelling software. A commercial package such as Microwave Office from AWR Research can be used to generate a suitable model. If the resonators are to be square open-loop resonators as shown in the preferred embodiment, "Couplings of Microstrip Square Open-Loop Resonators for Cross-Coupled Planar Microwave Filters" by J- S. Hong and M. J. Lancaster, IEEE Transactions on Microwave Theory and Techniques MTT44(12) pp2099–2109 November 1996 is a useful reference describing the behaviour of such structures.

Figure 5:
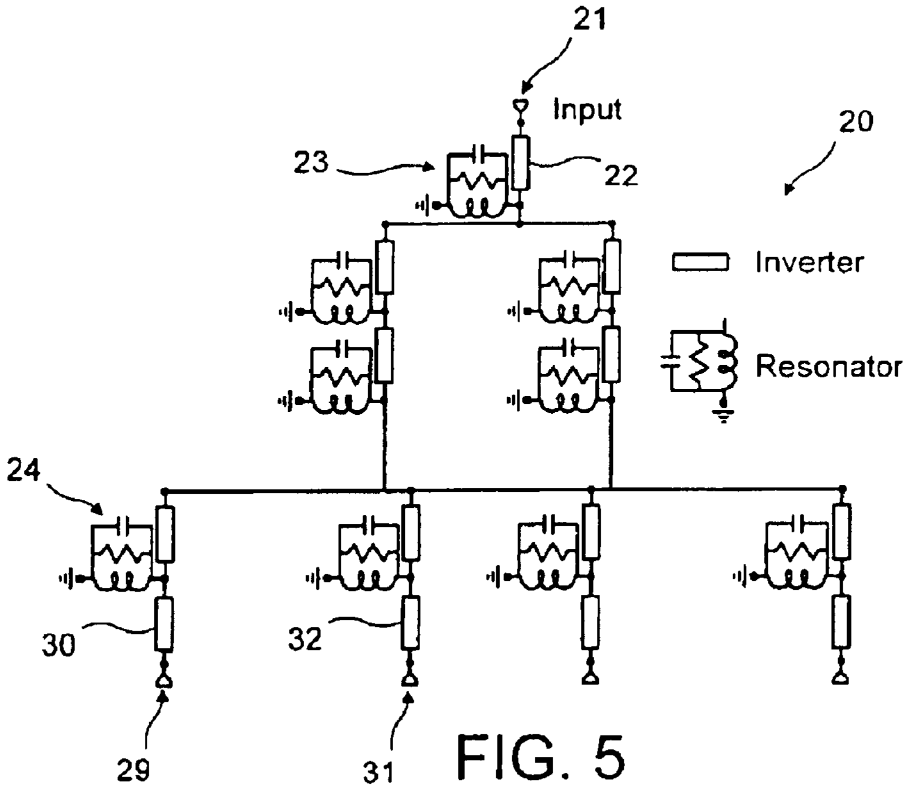
FIG. 5 is an equivalent circuit of the filter of FIG. 4.

An equivalent circuit for the filter of FIG. 4 is shown in FIG. 5. The circuit includes shunt resonant elements representing the resonators, and inverters representing the couplings. Using this circuit structure and simple electrical circuit analysis techniques, the frequency response of the embodiment can be determined.

It will be appreciated that, although the analysis of the equivalent circuit is relatively straightforward, the highly interactive nature of the component may mean that some experimental optimisation may be required. However, this is well within the capabilities of the ordinary skilled person in the relevant art.

Figure 6:
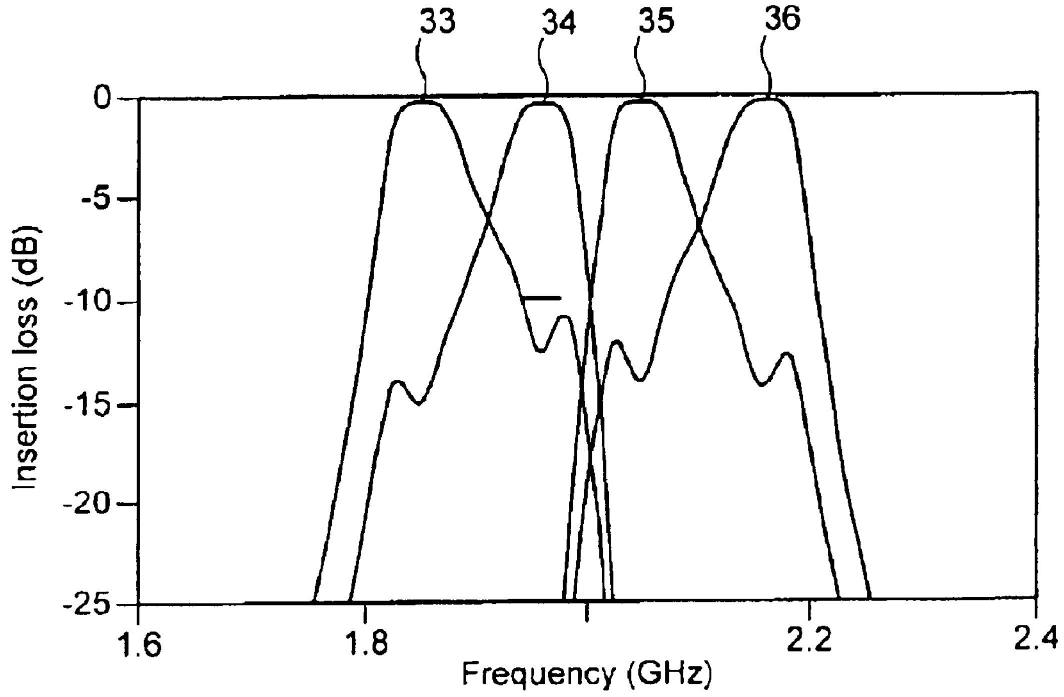
FIG. 6 is a plot of the frequency response of the filter of FIGS. 4 to 5.

The frequency response of the filter of FIG. 4 is shown in FIG. 6. It will be seen that there are effectively four major maxima 33, 34, 35 and 36, corresponding to the four outputs from the circuit of FIG. 4. Each of these outputs corresponds with frequency bands approximately 500 MHz wide, centred at frequencies of 1.85, 1.95, 2.05 and 2.15 GHz respectively. This filter has use in the telecommunications industry for separating an incoming microwave signal into multiple band-limited channels or bins.

In the examples shown, all inductors are operatively coupled to all other inductors in the filter. However, in some cases, it may be desirable that certain resonators are not coupled to certain other resonators in the filter. This can be achieved by arranging the resonators in such a way that either the relative angles of the respective electrical and magnetic fields are such that the resonators do not interact, or by positioning them far enough away from each other that their relative effect on each other is negligible in view of the circuit's overall response.

In one preferred form, the resonators are made from a conductor such as copper. However, in other cases, they can be made from a superconducting material, such as Niobium (Nb), or High Temperature Superconductors such as $YBa_2Cu_3O_{7-\delta}$ or $Tl_2Ba_2CaCu_2O_8$. It will be appreciated that these are exemplary materials only, and that other suitable combinations will suggest themselves to those skilled in the art.

In the case of thin film High Temperature Superconductor devices, the preferred dielectric materials are compatible single-crystalline substrates like $LaAlO_3$, MgO or sapphire with a buffer layer. Again, these materials are preferences only.

It will be appreciated that a suitable cooling engine will be required to maintain the superconducting material below its critical temperature. Such cooling engines are well known in the art and are therefore not described in more detail here.

The invention has been described with reference to square open-loop resonators. However, it will be understood by those skilled in the art that other types of resonators can also be used. For example, other planar resonators, coaxial resonators, dielectric resonator, or cavity resonators can all be used in place of the square open-loop type. It will be understood that these have different responses to square open-loop resonators, and that different modelling and optimisation techniques will therefore need to be used.

Figure 7:
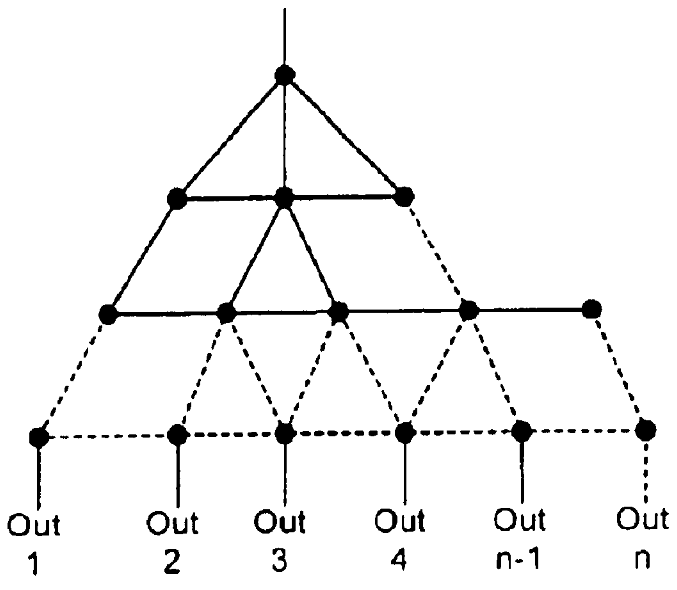
FIG. 7 is a simplified generalised representation of a filter according to the invention.

It will be appreciated that the filters illustrated have been exemplary only, and that other numbers and types of components and couplings can be used. FIG. 7 shows one type of generalisation in which n outputs are provided. It will be noted that the number of couplings involved varies from resonator to resonator. However, there is always a coupling from an input to at least two outputs.

Although the invention has been described with reference to a number of specific embodiments, it will be understood by those skilled in the art that the invention may be embodied in many other forms.

What is claimed is:

1. A radio frequency filter for generating at least first and second predetermined radio frequency bands from a received radio frequency signal containing signals in at least the first and second radio frequency bands, the radio frequency filter including:

a first resonant component for accepting the radio frequency signal via an input coupling;

a second resonant component operatively coupled to the first resonant component via a first coupling;

a third resonant component operatively coupled to the first resonant component via a second coupling and to the second resonant component via a third coupling;

a first output operatively coupled to the second resonant component via a fourth coupling a second output operatively coupled to the third resonant component via a fifth coupling;

wherein the characteristics of the couplings and the resonant components are selected such that the first predetermined radio frequency band is available at the first output and the second radio frequency band is available at the second output.

2. A filter according to claim 1, wherein one or more of the operative couplings are magnetic inductive and/or electric capacitive couplings.

3. A filter according to claim 1, wherein one or more of the resonant components is made wholly or partly of a superconducting material.

4. A filter according to claim 1, wherein one or more of the operative couplings includes one or more additional resonant components.

5. A filter according to claim 4, wherein there are two or more of the additional resonant components operatively coupled to each other.

6. A filter according to claim 1, further including one or more additional resonant components, each additional resonant component being operatively coupled to one or more of the other resonant components in the filter and to an additional output, wherein additional radio frequency bands are available at the respective additional outputs.

7. A filter according to claim 1, configured to operate at microwave frequencies between 500 MHz to 20 GHz.

8. A filter according to claim 1, wherein the first, second, and third resonant components are selected from the group consisting of planar resonators, coaxial resonators, dielectric resonators, cavity resonators, and square open-loop resonators.

9. A radio frequency filter for generating at least first and second predetermined radio frequency bands from a received radio frequency signal containing signals in at least the first and second radio frequency bands, the radio frequency filter including:

a first resonant component for accepting the radio frequency signal from an input via an input coupling;

a second resonant component operatively coupled to the first resonant component;

a third resonant component operatively coupled to the first resonant component;

a first output operatively coupled to the second resonant component; and a second output operatively coupled to the third resonant component;

wherein the third resonant component is operatively coupled to the second resonant component such that the first output is operatively coupled to the input via the third resonant component; and wherein the characteristics of the couplings and the resonant components are selected such that the first predetermined radio frequency band is available at the first output and the second radio frequency band is available at the second output.

10. A radio frequency filter for generating at least first and second predetermined radio frequency bands from a received radio frequency signal containing signals in at least the first and second radio frequency bands, the radio frequency filter including:

a first resonant component for accepting the radio frequency signal via an input coupling;

a second resonant component operatively coupled to the first resonant component via a first coupling;

a third resonant component operatively coupled to the first resonant component via a second coupling and to the second resonant component via a third coupling;

a first output operatively coupled to the second resonant component via a fourth coupling; and a second output operatively coupled to the third resonant component via a fifth coupling;

wherein the characteristics of the couplings and the resonant components are selected such that the first predetermined radio frequency band is available at the first output and the second radio frequency band is available at the second output; and wherein the filter is configured to operate at microwave frequencies between 500 MHz to 20 GHz.

11. A filter according to claim 10, wherein one or more of the operative couplings are magnetic inductive and/or electric capacitive couplings.

12. A filter according to claim 10, wherein one or more of the resonant components is made wholly or partly of a superconducting material.

13. A filter according to claim 10, wherein one or more of the operative couplings includes one or more additional resonant components.

14. A filter according to claim 13, wherein there are two or more of the additional resonant components operatively coupled to each other.

15. A filter according to claim 10, further including one or more additional resonant components, each additional resonant component being operatively coupled to one or more of the other resonant components in the filter and to an additional output, wherein additional radio frequency bands are available at the respective additional outputs.

16. A filter according to claim 10, wherein the first, second, and third resonant components are selected from the group consisting of planar resonators, coaxial resonators, dielectric resonators, cavity resonators, and square open-loop resonators.

* * * * *